United States Patent
Embry

(10) Patent No.: US 8,333,333 B2
(45) Date of Patent: Dec. 18, 2012

(54) APPARATUS FOR DUST CONTROL

(76) Inventor: Lynn Embry, Bakersfield, CA (US)

( * ) Notice: Subject to any disclaimer, the term of this patent is extended or adjusted under 35 U.S.C. 154(b) by 141 days.

(21) Appl. No.: 11/607,661

(22) Filed: Nov. 30, 2006

(65) Prior Publication Data

US 2007/0125558 A1    Jun. 7, 2007

Related U.S. Application Data

(60) Provisional application No. 60/741,788, filed on Dec. 1, 2005.

(51) Int. Cl.
*B05B 1/20* (2006.01)
*E01C 7/36* (2006.01)
*E01C 21/00* (2006.01)

(52) U.S. Cl. .......... 239/159; 239/146; 239/161; 404/76; 404/91; 404/90

(58) Field of Classification Search .......... 239/159–170; 56/7, DIG. 15; 172/687–692, 247–253, 311, 172/456, 272, 273; 404/75, 76, 90
See application file for complete search history.

(56) References Cited

U.S. PATENT DOCUMENTS

| | | | |
|---|---|---|---|
| 304,024 A * | 8/1884 | Pharo | 126/271.2 A |
| 2,029,166 A | 1/1936 | Hales | |
| 2,223,809 A | 12/1940 | Rucker | |
| 2,682,132 A * | 6/1954 | Marihart | 47/1.01 R |
| 3,866,834 A * | 2/1975 | Shannon | 239/167 |
| 4,010,900 A * | 3/1977 | Flix et al. | 239/168 |
| 4,068,802 A | 1/1978 | Goings | |
| 4,302,904 A | 12/1981 | Mead | |
| 4,371,477 A | 2/1983 | Karowiec et al. | |
| 4,553,702 A | 11/1985 | Coffee et al. | |
| 4,592,164 A | 6/1986 | Ballu | |
| 4,677,787 A * | 7/1987 | Said | 47/1.5 |
| 4,746,065 A * | 5/1988 | Gorder | 239/168 |
| 4,747,174 A * | 5/1988 | Hightower | 15/78 |
| 4,887,384 A * | 12/1989 | Reyne | 47/1.5 |
| 4,990,025 A * | 2/1991 | Young et al. | 404/92 |
| 5,219,208 A | 6/1993 | Liao et al. | |
| 5,251,704 A * | 10/1993 | Bourgault et al. | 172/311 |
| 5,511,499 A * | 4/1996 | Edinger | 111/200 |
| 5,720,127 A | 2/1998 | Robertson | |
| 5,768,823 A * | 6/1998 | Nelson | 47/1.7 |
| 5,803,955 A | 9/1998 | Raring | |
| 6,036,103 A | 3/2000 | Benest | |

* cited by examiner

*Primary Examiner* — Len Tran
*Assistant Examiner* — James Hogan
(74) *Attorney, Agent, or Firm* — James M. Duncan, Esq.; Klein, DeNatale, Goldner, Cooper, et al.

(57) ABSTRACT

A dust-control apparatus may be used in combination with tilling, cultivating, harvesting, construction machinery, and other mobile soil treatment implements. The apparatus applies mist to dust particles where the mist is created by pumping water or other liquid through nozzles. Because the apparatus is used in combination with the operation of the dust-generating machinery, the dust suppressing mist is applied nearly simultaneously to the generation of the dust by the agitation of the soil by the machinery. In one embodiment of the device, the operation of the pump or valves which control liquid flow to the nozzles is automatically activated by a optical sensor. The optical sensors cause either the starting of a pump or opening of a valve thereby increasing or decreasing the pressure and/or volume of the liquid upon the dust level reaching a preset trigger point as detected by the sensor.

25 Claims, 4 Drawing Sheets

APPARATUS FOR DUST CONTROL

CROSS-REFERENCE TO RELATED APPLICATION

U.S. Provisional Application No. 60/741,788 for this invention was filed on Dec. 1, 2005 for which the inventor claims domestic priority.

BACKGROUND OF THE INVENTION

The present invention generally relates to devices for controlling dust and other particulates generated from agitation of the ground or other soil bearing surfaces. In particular, a mountable apparatus for use in combination with agricultural and/or soil working machinery is disclosed. The apparatus and the method are applied to the problems presented by air particulates, to reduce dust generated by agricultural and soil working machinery. The general mechanism employed by the apparatus is to wet the airborne dust particles with mist.

Dust generation by agricultural and construction machinery is a known problem, particularly in and areas. To name just a few problems caused by dust generation, dust particles result in air pollution, water pollution, soil loss, human and animal health problems, and potentially hazardous reductions in visibility. In addition, the dust can adversely impact the health of various plants. In an effort to reduce dust production, some air pollution control districts impose speed limitations on farm machinery or otherwise impose different dust control measures.

One method of controlling dust is by applying water to the ground surface, or by applying water mist to the dust particles. A number of different devices are known for using water mist for dust reduction in industrial activities. Examples of these devices are disclosed in U.S. Pat. Nos. 4,371,477; 5,219,208; and 5,803,955. However, these devices are typically stationary devices used primarily for mining and material transfer operations.

It is also know to use irrigation for dust control in agricultural and construction activities. The typical form of irrigation is to sprinkle the ground surface with water until the surface is wet. The water confines and settles the dust for a temporary period of time.

SUMMARY OF THE INVENTION

The presently disclosed dust-control apparatus is used in combination with machinery which generates dust by moving across, tilling, planting, cultivating, harvesting, or otherwise agitating the ground surface. The disclosed apparatus acts to bind the dust as the dust is created by the implement. Other known irrigation methods of dust control in agricultural and construction applications typically sprinkle or drench the ground surface with water until the ground surface is wet or muddy. In contrast, the present system applies a water mist created by pressurized water injection through nozzles. Because the apparatus is used in combination with the operation of the machinery, the dust suppressing mist is applied nearly simultaneously to the generation of the dust by the agitation of the soil by the mobile soil treatment implement. An embodiment of the device allows the operator to manually control the apparatus so that the mist is applied upon the operator manipulating the controls. In another embodiment of the device, the operation of the water pump or valves which control water flow to the nozzles is automatically activated by a sensor, which turns the pump on to create mist upon the dust level reaching a preset trigger point as detected by an optical sensor.

The apparatus, which is used in combination with mobile agricultural or construction equipment, comprises a water reservoir, pump, pump drive means (such as a directly coupled motor or engine or electrical power source or a power take-off), connecting conduit, and a plurality of nozzles which are mounted at predetermined locations on the equipment. The apparatus further comprises control means for activating the pump drive means. The control means may comprise manual controls. Alternatively, the controls means may be automated and activated and deactivated respectively by preset start and stop triggering logic.

DESCRIPTION OF THE INVENTION

Figure 1:
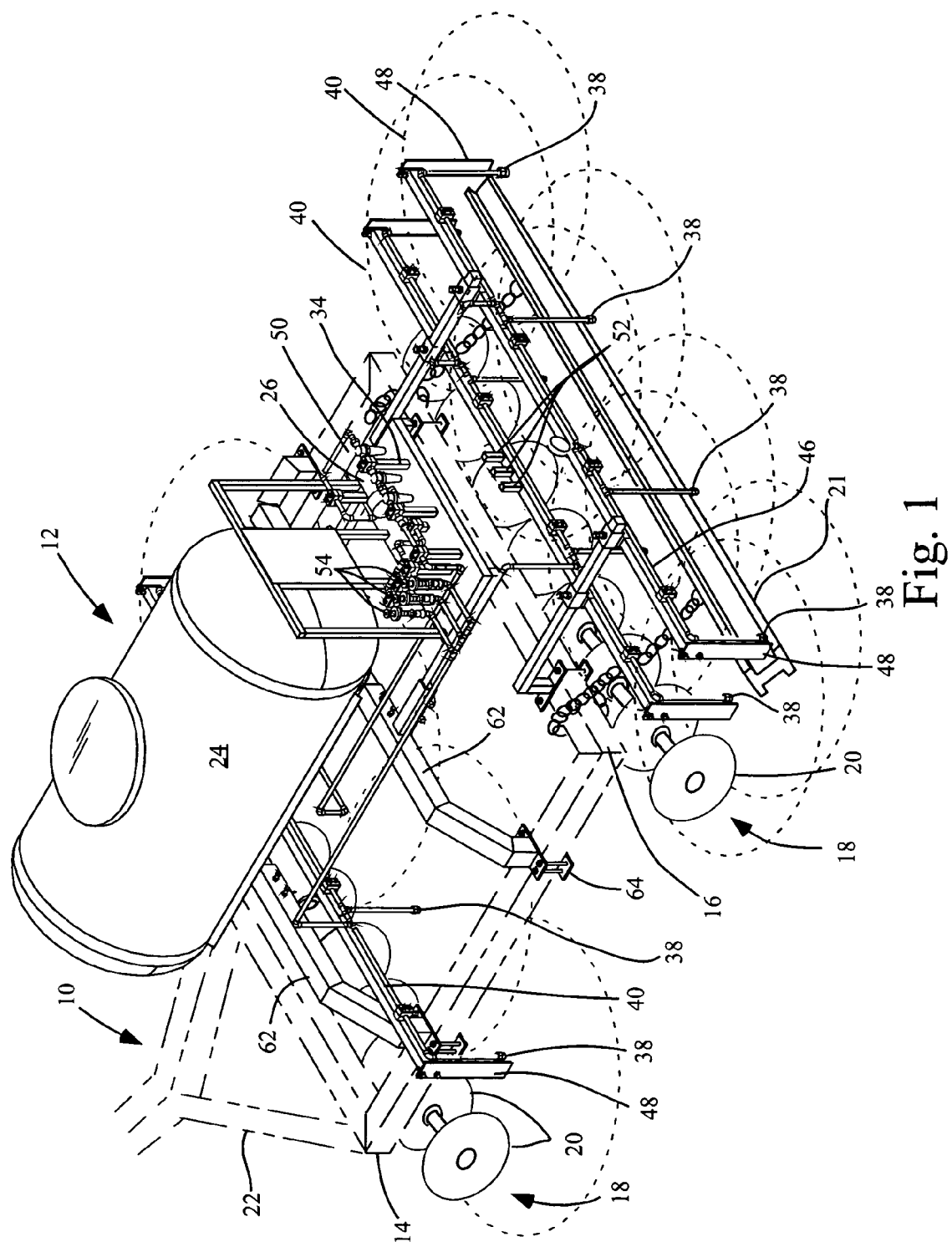
FIG. 1 shows a perspective view of an embodiment of the disclosed apparatus used in combination with a tillage implement.

Referring now specifically to FIG. 1, one embodiment of the apparatus is used in combination with a mobile soil treatment implement 10, such as a disc or other tilling implement as shown in the figure. As used in this specification, the term "mobile soil treatment implement" generally refers to different classes of vehicles or implements which are used in both agriculture and construction. For agricultural applications, mobile soil treatment implements include tilling implements, planting implements, cultivating implements, and harvesting implements. By way of example, tilling implements 10 include discs (as shown in the figures), rippers, scrapers, plows, mulchers, harrow disks, land planes, levelers and furrowing out rigs. Planting implements include rollers, sleds, drills and rakes. Cultivation implements include mowers, knives, and blades. Harvesting equipment includes various types of harvesters and combines. The agricultural or construction implement may be of the type which requires a tow vehicle, such as a tractor, or in the alternative, may be self-propelled. Given the pervasive use of wheeled vehicles on agricultural and/or construction sites and the working of the soil caused by the wheels of those vehicles, the term "mobile soil treatment implement" may also comprise wheeled vehicles including trucks, all-terrain vehicles, four wheel drive vehicles, etc.

An embodiment of the mist-discharging apparatus 12 comprises a mobile soil treatment implement 10 such as the disc shown in the figures, which is a tilling implement. The disc has a front end 14 and a back end 16 defining a longitudinal axis L. The disc may comprise two or more banks 18 of tilling members 20 disposed along the longitudinal axis as shown in the figures. As shown in FIG. 1, the soil treatment implement 10 may comprise towing means 22 such as a three-point hitch or tongue which facilitates towing the implement with a tractor or other towing vehicle. The soil treatment implement 10 may further comprise a drag bar 21 which is utilized to roughly grade the soil surface following the working of the soil with tilling members 20.

The apparatus 12 comprises liquid storage means, such as liquid storage vessel 24. A liquid storage vessel 24 having a volume range of 150 to 300 gallons has been found to be a suitable size for most applications. The liquid storage vessel 24 may either be attached to a tow vehicle, such as a tractor, or it may be attached to the mobile soil treatment implement 10 as shown in the figures. The apparatus 12 further comprises a pump 26. As with the liquid storage vessel 24, the pump 26 may either be attached to a tow vehicle or attached to the mobile soil treatment implement 10. The pump 26 has a suction end 28 and a discharge end 30, where the suction end is hydraulically connected to the liquid storage vessel with appropriate conduit 32, such as PVC pipe or flexible hose. As shown in FIG. 1, various pipe supports 34 may be used for locating and securing the conduit 32. Power means 36, such as a an electric motor, hydraulic motor, or power takeoff from the pulling vehicle, are operationally connected to the pump 26. The discharge end 30 of the pump 26 is hydraulically connected to a plurality of downwardly facing mist generating nozzles 38 which are attached to the mobile soil treatment implement 10.

Figure 2:
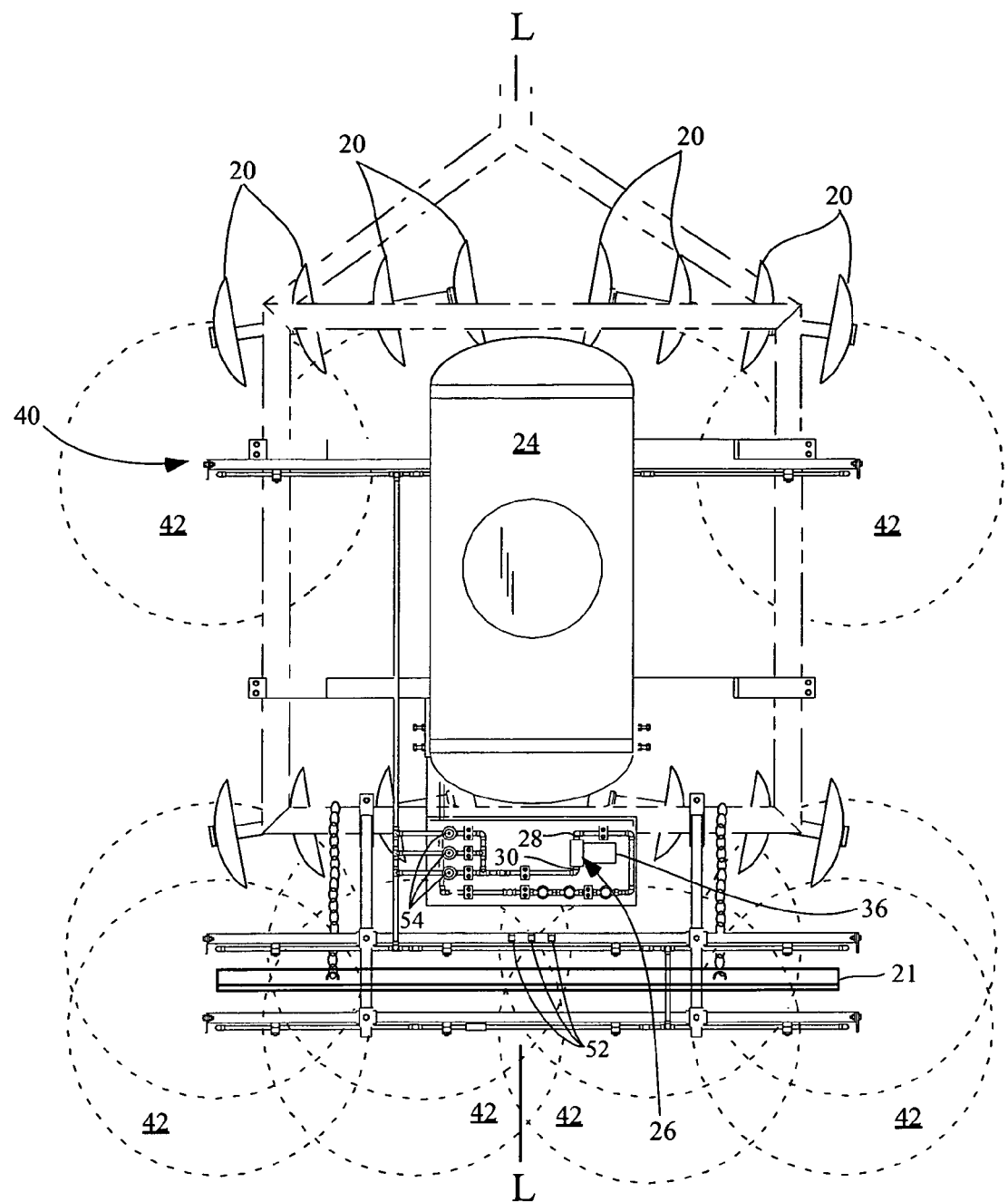
FIG. 2 shows a top view of an embodiment of FIG. 1.
Figure 3:
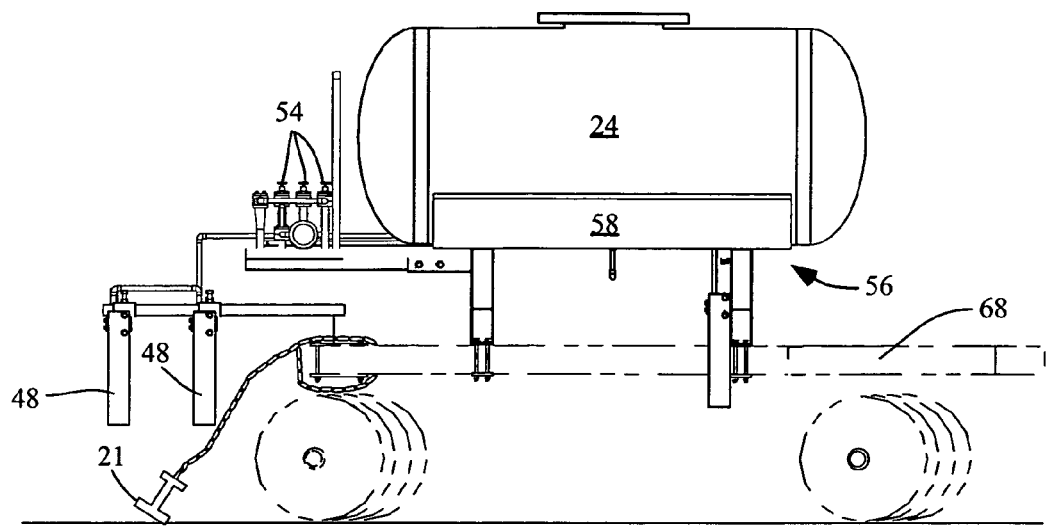
FIG. 3 shows a right side view of the embodiment of FIG. 1.
Figure 4:
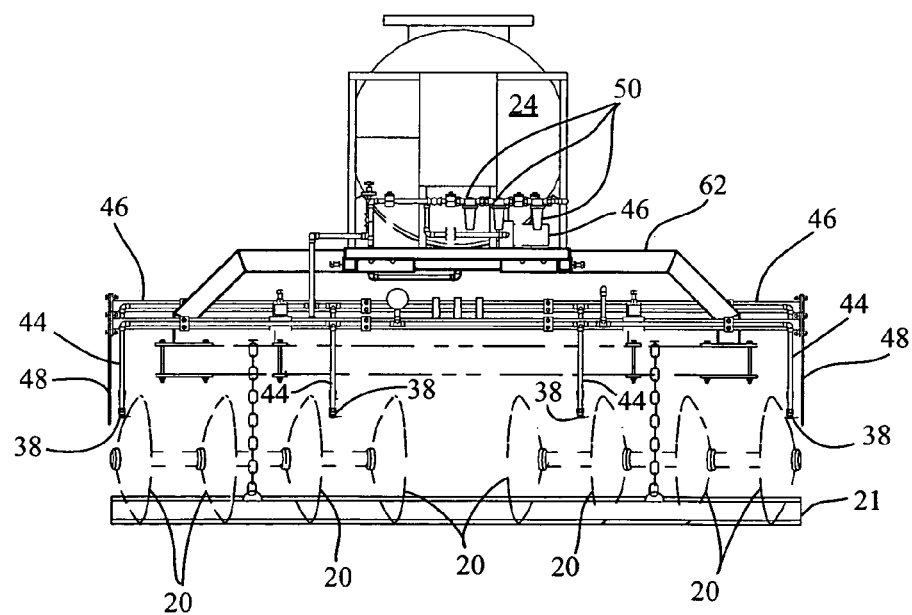
FIG. 4 shows a rear view of the embodiment of FIG. 1.
Figure 5:
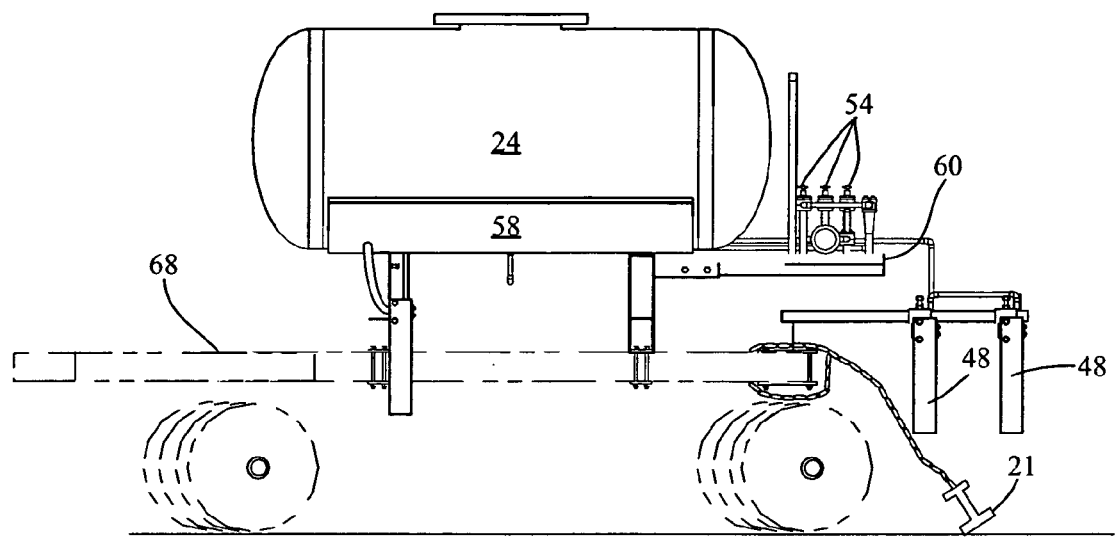
FIG. 5 shows a left side view of the embodiment of FIG. 1.
Figure 6:
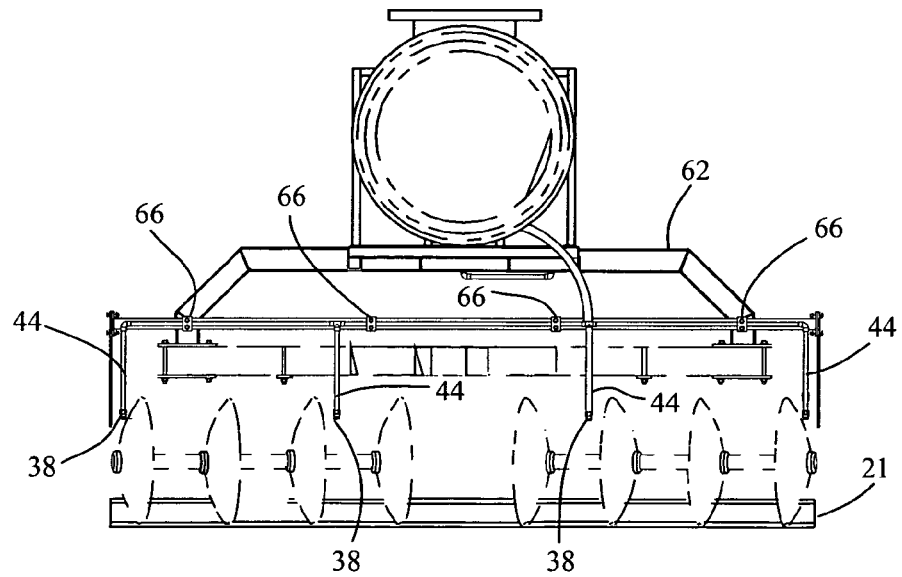
FIG. 6 shows a front view of the embodiment of FIG. 1.

Depending upon the application, the mist generating nozzles 38 may have different spray configurations. As shown in FIGS. 1 and 2, the mist generating nozzles 38 may be mounted in a banked configuration, that is a plurality of nozzles are oriented in along an axis which is transverse to the longitudinal axis L of the mobile soil treatment implement 10. In this configuration, each bank may comprise a nozzle boom assembly 40, mounted transversely to the longitudinal axis L of the soil treating implement 10. The nozzle boom assembly 40 comprises several mist-emitting nozzles 38. Each boom assembly 40 may be mounted such that the nozzles emit mist immediately following agitation of the soil by either the tilling members 20 or drag bar 21. The boom assemblies may be constructed so as to allow the bank of mist generating nozzles 38 to either be raised, lowered, or moved forward or backward as desired.

The nozzles 38 may emit overlapping and generally circular mist patterns 42 as shown in FIGS. 1 and 2. It may also be advantageous to have nozzles 38 which emit different mist patterns. For example, it may be advantageous to have nozzles 38 in a first row having a 180 degree spray configuration. Nozzles 38 in a second row may have a 360 degree spray configuration. The nozzles 38 may mounted at the end of extension nipples 44 which are connected into the distribution piping 46. The extension nipples 44 facilitate placement of the nozzles 38 at an optimal location for discharging the mist. The extension nipples 44 may comprise PVC pipe. Downwardly oriented guard members 48 may be employed to protect the extension nipples 44 from impact damage. The apparatus may further comprise inline filters 50 to prevent clogging of the nozzles 38 with impurities in the water.

It has been found that mist emitting nozzles 38 having an opening of approximately 0.015 to 0.030 inch provide an acceptable mist when used in conjunction with a pump 26 having approximately 20 to 40 psig discharge pressure. One source of this type of nozzle 38 is that manufactured by AQUARIOUS for drip irrigation systems. It is to be appreciated that the disclosed apparatus does not drench the soil, but rather creates a mist which binds airborne dust particles. In addition, the cooling effect of the mist acts to lower temperatures at ground level and reduces dust particles being lifted by air flow generated from the thermal gradient. The reduction of the thermal transport mechanism reduces particulate emissions which might otherwise be dispersed in a large geographic area and impacting the regional air quality.

The apparatus may further comprise controls for activating the prime mover 36 on the pump 26. The controls may comprise a simple on-off switch which allows the operator to turn the pump on and off as desired. Alternatively, the controls may be more elaborate. For example, the pump may be automatically activated by optical sensors 52, which sense either light level or particulate matter levels and emit an output signal when preset light thresholds are detected. It has been found that an acceptable optical sensor 24 is the BALLUF BOS 65 K Series, including part number BOS-65K-1-M110T-1, which emits an infrared beam which generates an output signal based upon reflection of an emitted infrared beam.

In the embodiment utilizing optical sensors, water would be supplied to the nozzles 38 when the dust level (i.e., the light level or particulate level) reaches a magnitude sufficient to trigger the preset value on the optical sensor 52, and water would continue to be supplied to the nozzles 38 until the dust is reduced to a level which triggers a preset shut-off of the pump 26. The automated controls allow the operator of the implement 10 to focus on operation of the implement as opposed to concentrating on reducing the dust. As an alternative to controlling the pump, optical sensors 52 may be connected to solenoid-controlled actuators on valves 54 which may be used to control flow of liquid to each bank of nozzles 14. In this embodiment, a separate optical sensor 24 is used to activate each valve 54, thereby allowing flow to the applicable bank of nozzles 14. Relays and/or transformers may be required to obtain the proper voltage and current for driving a valve actuator or pump controls.

Although FIG. 1 shows all three optical sensors 52 at a single location, it is to be appreciated that the optical sensors may be located as desired on the particular mobile soil treatment implement 10. Placement of the optical sensors 52 at different locations on the mobile soil treatment implement 10 may reduce water consumption where sufficient dust suppression is generated by the first bank of nozzles 38. It is to be appreciated that other controls may used in conjunction with the pump 26. For example, variable speed pumps may be used which may increase water flow and thereby increase the pressure drop across the nozzle and the mist volume. It is also to be appreciated that the disclosed apparatus is not limited to water for dust control. Other misting dust control agents may be utilized as desired. It is also to be appreciated that while the figures show a disc implement, the mist-discharging apparatus may comprise a number of different agricultural and construction implements.

It is to be appreciated that various components of the mist-discharging apparatus 12 may either be individually attached to the mobile soil treatment implement, or attached separately to a towing vehicle or related vehicle. As an alternative embodiment, the components of the mist-discharging apparatus 12 may be packaged together such that they may be readily installed to an existing piece of equipment. In this embodiment, a support structure 56 may be utilized which is used for supporting some of the different components. The support structure may comprise a vessel cradle 58 which is used to mount the liquid storage vessel 24. The support structure 56 may further comprise a pump platform 60 which may be used for mounting the pump 26, valves 54, filters 50 and interconnecting piping as illustrated in FIG. 1. The vessel cradle 58 and pump platform 60 are secured to support members 62, which are attachable to the frame work 68 of the soil treatment implement 10 with attachment means 64 such as bolts and attachment plates as shown in FIG. 1. Distribution piping may be attached to the nozzle boom assemblies 40 with clamps 66.

While the above is a description of various embodiments of the present invention, further modifications may be employed without departing from the spirit and scope of the present invention. Thus the scope of the invention should not be limited according to these factors, but according to the claims to be filed in the forthcoming utility application.

What is claimed is:

1. A mobile apparatus which, by a combination of a sufficiently high discharge pressure with a sufficiently small nozzle diameter size, generates a cooling mist to reduce the thermal transport of dust particles generated by the apparatus as the apparatus works a soil surface, the apparatus comprising:
   a soil agitation means which generates dust as the apparatus works the soil surface;
- a liquid storage vessel;
- a pump having a suction end and a discharge end, the suction end hydraulically connected to the liquid storage vessel, wherein the pump discharges the stored liquid with the discharge pressure at 20 psig or greater;
- power means attached to the pump; and
- the discharge end hydraulically connected to a plurality of downwardly facing mist generating nozzles attached to the mobile soil treatment implement adjacent to the soil agitation means, the mist generating nozzles configured to disperse the cooled mist above the soil surface, wherein the nozzle diameter size of the mist generating nozzles is no larger than 0.030 inches.

2. The mobile apparatus of claim 1 wherein the soil agitation means comprises a plurality of tilling members.

3. The mobile apparatus of claim 2 further comprising a front end and a back end defining a longitudinal axis, wherein the mobile apparatus comprises two or more banks of tilling members disposed along the longitudinal axis.

4. The mobile apparatus of claim 3 wherein the mist generating nozzles are mounted in a plurality of nozzle banks, wherein each nozzle bank is transverse to the longitudinal axis.

5. The mobile apparatus of claim 4 wherein a nozzle bank is disposed to the rear of each bank of tilling members.

6. The mobile apparatus of claim 1 further comprising control means for activating the power means.

7. The mobile apparatus of claim 1 further comprising filtering means disposed between the discharge end of the pump and the plurality of downwardly facing mist generating nozzles.

8. The mobile apparatus of claim 1 further comprising valve means disposed between the discharge end of the pump and the plurality of downwardly facing mist generating nozzles.

9. The mobile apparatus of claim 8 further comprising actuating means for closing and opening the valve means.

10. The mobile apparatus of claim 1 wherein the liquid storage vessel and the pump are mounted to the mobile soil treatment implement.

11. The mobile apparatus of claim 6 further comprising optical sensors connected to the control means, the optical sensors causing the control means to activate and deactivate the power means at preset levels.

12. The mobile apparatus of claim 9 further comprising optical sensors connected to the actuating means causing the actuating means to open and close the valve means at preset light levels.

13. A mobile apparatus which, by a combination of a sufficiently high discharge pressure with a sufficiently small nozzle diameter size, generates a cooling mist to reduce the thermal transport of dust particles generated by the apparatus as the apparatus works a soil surface, the apparatus comprising:

- a soil agitation means which generates dust as the apparatus works the soil surface;
- a support structure comprising a vessel cradle and a pump platform each mounted on support members, the support members having means for attaching to the mobile apparatus;
- a liquid storage vessel disposed on the vessel cradle;

a pump disposed on the pump platform, the pump having a suction end and a discharge end, the suction end hydraulically connected to the liquid storage vessel, wherein the pump discharges the stored liquid with the discharge pressure at 20 psig or greater;

- power means attached to the pump;
- a nozzle boom assembly mounted on the mobile soil treatment implement; and
- a plurality of downwardly facing mist generating nozzles attached to the nozzle boom assembly, the mist generating nozzles hydraulically connected to the discharge end of the pump, the mist generating nozzles configured to disperse the cooled mist above the soil surface in overlapping patterns, wherein the nozzle diameter size of the mist generating nozzles is no larger than 0.030 inches.

14. The mobile apparatus of claim 13 wherein the soil agitation means comprises a plurality of tilling members.

15. The mobile apparatus of claim 13 further comprising valve means disposed between the discharge end of the pump and the plurality of downwardly facing mist generating nozzles.

16. The mobile apparatus of claim 15 wherein the valve means are disposed on the pump platform.

17. The mobile apparatus of claim 16 further comprising actuating means for closing and opening the valve means.

18. The mobile apparatus of claim 17 further comprising optical sensors connected to the actuating means causing the actuating means to open and close the valve means at preset levels.

19. A mobile apparatus which, by a combination of a sufficiently high discharge pressure with a sufficiently small nozzle diameter size, generates a cooling mist to reduce the thermal transport of dust particles generated by the apparatus as the apparatus works a soil surface, the apparatus comprising:

- a front end and a back end defining a longitudinal axis, wherein the apparatus comprises a soil agitation means which generates dust as the apparatus works the soil surface, the soil agitation means comprising two or more banks of tilling members disposed along the longitudinal axis;
- a support structure comprising a vessel cradle and a pump platform each mounted on support members, the support members having means for attaching to the apparatus;
- a liquid storage vessel disposed on the vessel cradle;
- a pump disposed on the pump platform, the pump having a suction end and a discharge end, the suction end hydraulically connected to the liquid storage vessel, wherein the pump discharges the stored liquid with the discharge pressure at 20 psig or greater;
- power means attached to the pump;
- valve means hydraulically connected to the discharge end of the pump;
- a nozzle boom assembly mounted on the mobile soil treatment implement; and
- a plurality of downwardly facing mist generating nozzles attached to the nozzle boom assembly, the mist generating nozzles hydraulically connected to the valve means, the mist generating nozzles configured to disperse the cooled mist above the soil surface in overlapping patterns, wherein the nozzle diameter size of the mist generating nozzles is no larger than 0.030 inches.

20. The mobile apparatus of claim 19 wherein a nozzle boom assembly is disposed to the rear of each bank of tilling members, wherein the axis of the nozzle beam assembly is transverse to the longitudinal axis.

21. A method of controlling dust generated during agricultural activities on a soil surface, the method comprising:
   agitating the soil surface with a mobile soil treatment implement;
   ascertaining whether dust particles generated by the agitation of the soil surface require suppression;
   generating a cooled mist by pumping a liquid through a plurality of a plurality of downwardly facing mist generating nozzles attached to the mobile soil treatment implement, wherein the mist generating nozzles have a diameter no larger than 0.030 inches and receive a liquid from a pump having a discharge pressure of 20 psig or greater; and
   dispersing the cooled mist above the soil surface to reduce the temperature at the soil surface, thereby reducing the lifting of dust particles by air flow generated from a thermal gradient.

22. The method of claim 21 wherein the mobile soil treatment implement comprises a plurality of tilling members.

23. The method of claim 21 further comprising a valve means disposed between the pump and the plurality of downwardly facing mist generating nozzles.

24. The method of claim 23 further comprising actuating means for closing and opening the valve means.

25. The method of claim 24 further comprising optical sensors connected to the actuating means causing the actuating means to open and close the valve means at preset levels.

* * * * *